United States Patent [19]

Hopper et al.

[11] Patent Number: 5,289,283
[45] Date of Patent: Feb. 22, 1994

[54] INTER-FRAME VIDEO FILTER HAVING SELECTIVE LINEAR AND NON-LINEAR TRANSFER CHARACTERISTICS AS FUNCTION OF INTER-FRAME DIFFERENCES

[75] Inventors: Robert W. Hopper; Michael W. Whybray, both of Ipswich, England

[73] Assignee: British Telecommunications, London, England

[21] Appl. No.: 828,986

[22] PCT Filed: Aug. 9, 1990

[86] PCT No.: PCT/GB90/01252

§ 371 Date: Feb. 5, 1992

§ 102(e) Date: Feb. 5, 1992

[87] PCT Pub. No.: WO91/03123

PCT Pub. Date: Mar. 7, 1991

[30] Foreign Application Priority Data

Aug. 15, 1989 [GB] United Kingdom ......... 8918559

[51] Int. Cl.⁵ .............................................. H04N 5/213
[52] U.S. Cl. ........................................ 368/607; 368/625
[58] Field of Search .......... 358/164, 162, 166, 167; 350/16, 37; 364/572; H04N 5/213

[56] References Cited

U.S. PATENT DOCUMENTS

| | | | |
|---|---|---|---|
| 4,058,836 | 11/1977 | Drewery et al. | 358/167 |
| 4,246,610 | 1/1981 | Takahashi | 358/167 |
| 4,249,210 | 2/1981 | Storey et al. | 358/167 |
| 4,550,340 | 10/1985 | Nicholson et al. | 358/36 |
| 4,635,217 | 1/1987 | O'Conner et al. | 364/572 |
| 4,689,671 | 9/1987 | Ohki et al. | 358/135 |
| 4,700,229 | 10/1987 | Hermann et al. | 358/37 |
| 4,851,911 | 7/1989 | Müller et al. | 358/167 |
| 4,994,906 | 2/1991 | Moriwake | 358/36 |
| 5,025,378 | 6/1991 | Kahler | 364/572 |
| 5,043,815 | 8/1991 | Yoshimura et al. | 358/36 |
| 5,099,329 | 3/1992 | Oyamo et al. | 358/16 |
| 5,103,298 | 4/1992 | Kashimura et al. | 358/164 |

OTHER PUBLICATIONS

Proceedings of the I.E.E. -G, vol. 127, No. 2, Apr. 1989, Stevenage GB), T. J. Dennis: "Nonlinear temporal filter for television picture noise reduction" pp. 52-56.

Schamel Article: "Novel Structure For Television Picture Noise Reduction,"0 Electronic Letters, vol. 22, No. 14, Jul. 1986, pp. 732-734.

*Primary Examiner*—Victor R. Kostak
*Assistant Examiner*—Jeffrey A. Murrell
*Attorney, Agent, or Firm*—Nixon & Vanderhye

[57] ABSTRACT

Temporarily filtered video samples are formed as the sum of a previous frame output sample and a non-linear function of the difference between current and previous samples. The function is non-linear only for absolute values of differences less than 50% (preferably 10%) of the maximum range of the difference, and a smaller lookup table is used for implementing the non-linear function than would otherwise be the case.

6 Claims, 2 Drawing Sheets

INTER-FRAME VIDEO FILTER HAVING SELECTIVE LINEAR AND NON-LINEAR TRANSFER CHARACTERISTICS AS FUNCTION OF INTER-FRAME DIFFERENCES

BACKGROUND OF THE INVENTION

1. Field of the Invention

The present invention concerns video filters of the nonlinear temporal type, particularly, but not exclusively, for use in video coding systems.

2. Related Art

Nonlinear inter-frame digital filters are utilized to reduce noise while minimizing the blurring of moving objects or scene changes. In effect, a greater degree of filtering is introduced for small inter-frame differences than for larger ones.

BRIEF SUMMARY OF THE INVENTION

This invention provides look-up memory savings by restricting the non-linear filter characteristic to a small fixed portion of the filter transfer characteristic.

BRIEF DESCRIPTION OF THE DRAWINGS

Some embodiments of the invention will now be described, by way of example, with reference to the accompanying drawings, in which.

DETAILED DESCRIPTION OF EXEMPLARY EMBODIMENTS

Figure 1:
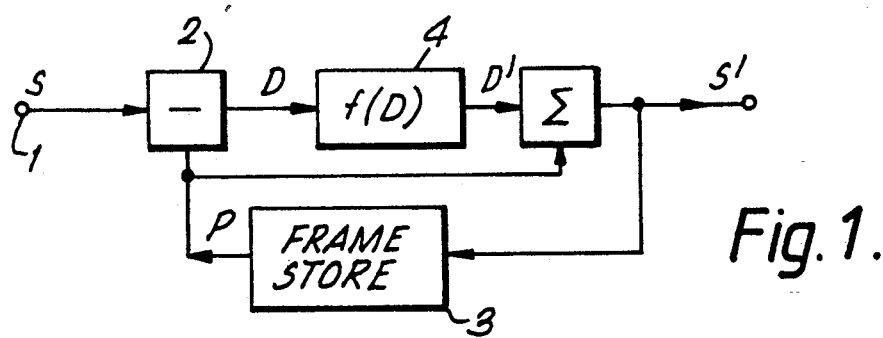
FIG. 1 is a block diagram of a filter.

A nonlinear temporal filter for digitally coded video signals has (FIG. 1) a video input 1. Each picture sample S is supplied to a subtractor 2 which takes the difference D between the new sample and the corresponding "previous picture" sample P from a frame store 3. The difference passes through a lookup unit 4 which forms a nonlinear function $D'=f(D)$. The modified difference $D'$ is added in an adder 5 to the previous picture sample P and the resulting filtered new sample $S'$ is forwarded to an output 6 and also written into the frame store 3 to form the new previous picture sample for the next frame.

Thus $S'=P+D'=P+f(D)=P+f(S-P)$.

Hence, if $f(D)=D$ then $S'=S$ and no filtering occurs. If $0<[f(D)/D]<1$ where $f(D)$ has the same sign as D, then some filtering takes place.

Figure 2:
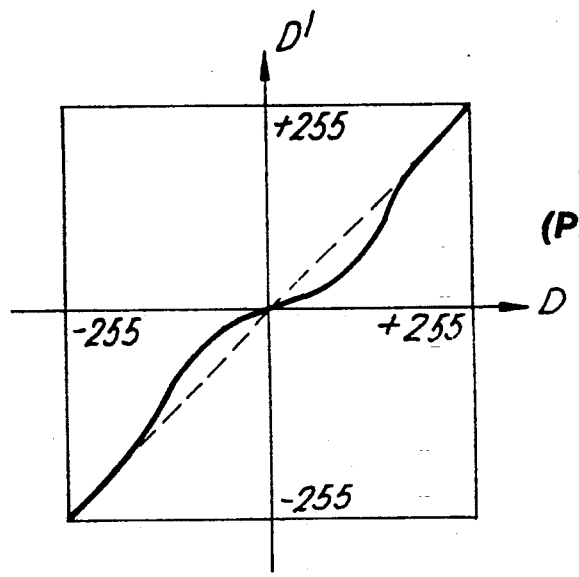
FIG. 2 illustrates a known characteristic for the non-linear lookup unit 4 FIG. 1.

The object of this temporal filtering is to reduce noise; however it has the disadvantage of causing blurring of moving objects on scene changes. Where the difference between the old and new samples is large, this is likely to be caused by changes in picture content, whilst a small difference is more likely to be caused by noise. Therefore the lookup unit 4 is given a nonlinear characteristic in order to effect a greater degree of filtering for small differences than for large ones. A typical characteristic curve is shown in FIG. 2, with a slope less than unity for small D, and asymptotic to the line $D'=D$.

Assuming a resolution of 8 bits/sample, the difference D (and modified difference $D'$) has a range of $-255$ to $+255$, and therefore a memory of $512\times9$ bit capacity is required for the lookup table. Although this is not a large memory bu current standards, nevertheless for an integrated circuit video coder implementation where silicon area may be at a premium, it is desirable to reduce this. Accordingly, it is arranged that the characteristic is nonlinear for values of D less than 50% of its maximum absolute value, or more preferably less than 10%, and linear with unity slope for greater values.

Figure 3:
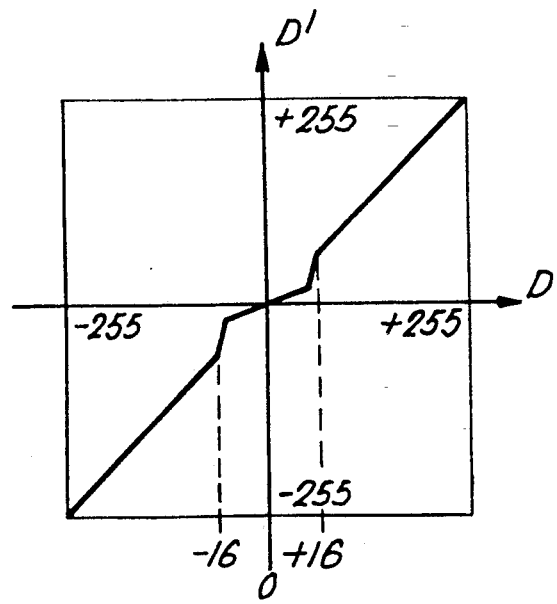
FIG. 3 illustrates a modified characteristic in accordance with one form of the present invention.
Figure 4:
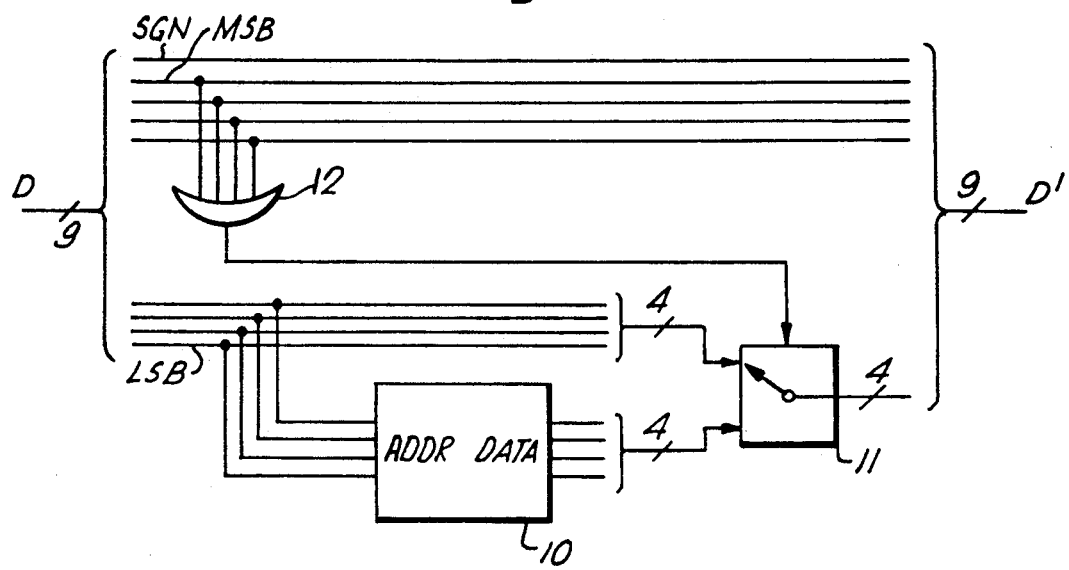
FIG. 4 is a block diagram of one form of lookup unit 4 in accordance with the invention.

For example, the characteristic in FIG. 3 has a unity slope for absolute values of D greater than or equal to 16. This can be implemented by the lookup unit shown in FIG. 4, where the four least significant bits of D form the address input to a read-only memory 10 having 16 locations each containing a four-bit word representing half of the characteristic depicted in the central region of FIG. 3. The data output from the memory 10 forms the four least significant bits of an 8-bit word (whose four most significant bits are always zero) forming one input to an electronic change-over switch or data selector 11. The other input to the selector 11 is the input word D (without its sign bit SGN).

Figure 5:
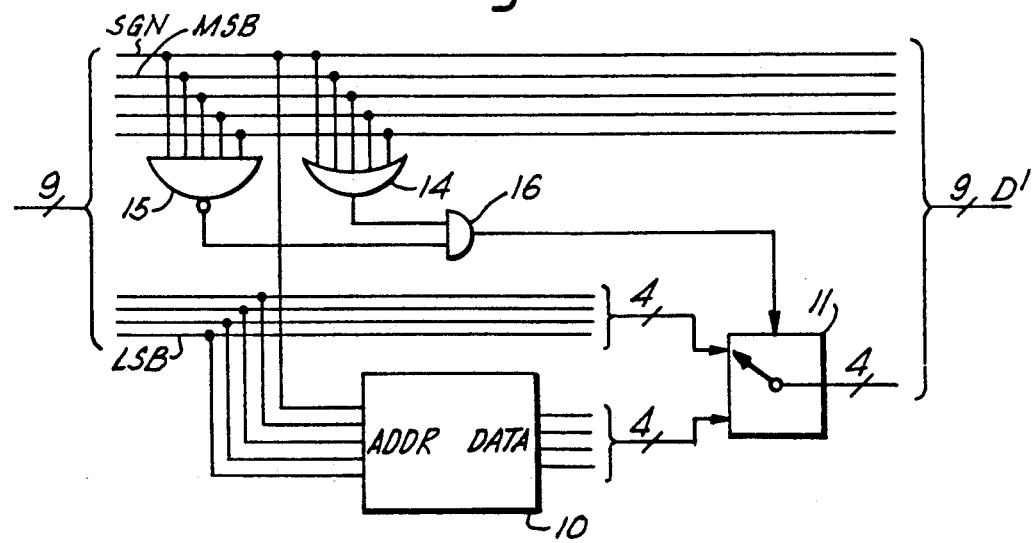
FIG. 5 is a block diagram of an alternative form of lookup unit 4.

The four most significant bits of D are connected via an OR gate 12 to the control input of the selector 11 so that whenever one of those bits is nonzero (i.e. $/D/\geq 16$) the selector passes the data input D directly to the output $D'$; otherwise the output is the output of the lookup table 10. The sign bit of the output $D'$ is of course the sign bit of the input D, unmodified. This structure assumes a sign-bit plus magnitude representation of negative values of D. In practice, a twos-complement representation is more convenient for implementing the addition and subtraction, in which case the more complex arrangement shown in FIG. 5 would be appropriate It differs from FIG. 4 in that (1) the read-only memory 10 covers a range from $-16$ to $+15$, with its additional address line fed from the sign bit of D, and (2) the range detector comprises an OR gate 14 which produces a logic zero output when the four most significant bits of D, and the sign bit are zero (i.e. $D<16$) a NAND gate 15 which produces a logic zero when these five bits are one (i.e. $D>-17$), and an AND gate 16 which produces an active low output when the output of one of the gates 14, 15 is zero.

We claim:

1. A filter for filtering digitally coded video signals comprising:

means for forming the difference (D) between each sample of an input signal (S) and the filter output corresponding to an earlier frame of the video signal (P); and means for forming an output sample (S') by adding said filter output corresponding to an earlier frame of the video signal (P) to a non-linear function (f(D)) of the difference (D);

the non-linear function (f(D)) including a non-linear portion for absolute values of the difference (D) less than a threshold and a linear portion for absolute values of the difference (D) greater than the threshold, said threshold being equal to 50% or less of the maximum possible absolute value of the difference (D);

the filter including non-linear processing means having:

a memory for storing values of the non-linear function (f(D)) corresponding to absolute values of difference (D) less than the threshold; and switching means responsive to each absolute value of difference (D) to select for output either the unmodified difference (D) or the corresponding stored value of said non-linear function (f(D)).

2. A filter according to claim 1 in which the threshold is 10% or less of the maximum possible absolute value of the difference (D).

3. An inter-frame digital video signal filter having means for forming the inter-frame difference between each sample of an input video signal and a filter output corresponding to an earlier frame of the video signal, said filter comprising:

a first circuit for passing unaltered input video signals having an inter-frame difference above a threshold value;

a second circuit connected to said first circuit for processing predetermined least significant bits of input video signals having an inter-frame difference below said threshold value; and a switch connected to said first and second circuits for effecting the filter output in dependence upon the value of the inter-frame difference between said video signals being above or below said threshold.

4. An inter-frame digital video signal filter as in claim 3 wherein said threshold is 50% or less of the maximum possible absolute value of said inter-frame difference.

5. An inter-frame digital video signal filter as in claim 3 wherein said threshold is 10% or less of the maximum possible absolute value of said inter-frame difference.

6. An inter-frame digital video signal filter having means for forming the inter-frame difference between each sample of an input video signal and a filter output corresponding to an earlier frame of the video signal, said filter comprising:

a first circuit for conveying digital video signals;

a non-linear digital signal processing circuit connected to process predetermined least significant bits of said digital video signals; and a switch connected to select as the filter output either said digital video signals of non-linearly processed versions of those signals including outputs from the non-linear processing circuit in dependence on the value of the inter-frame video signal difference.

* * * * *